July 13, 1937.  J. H. COHEN  2,087,217
FENDER GUIDE
Original Filed Oct. 31, 1932
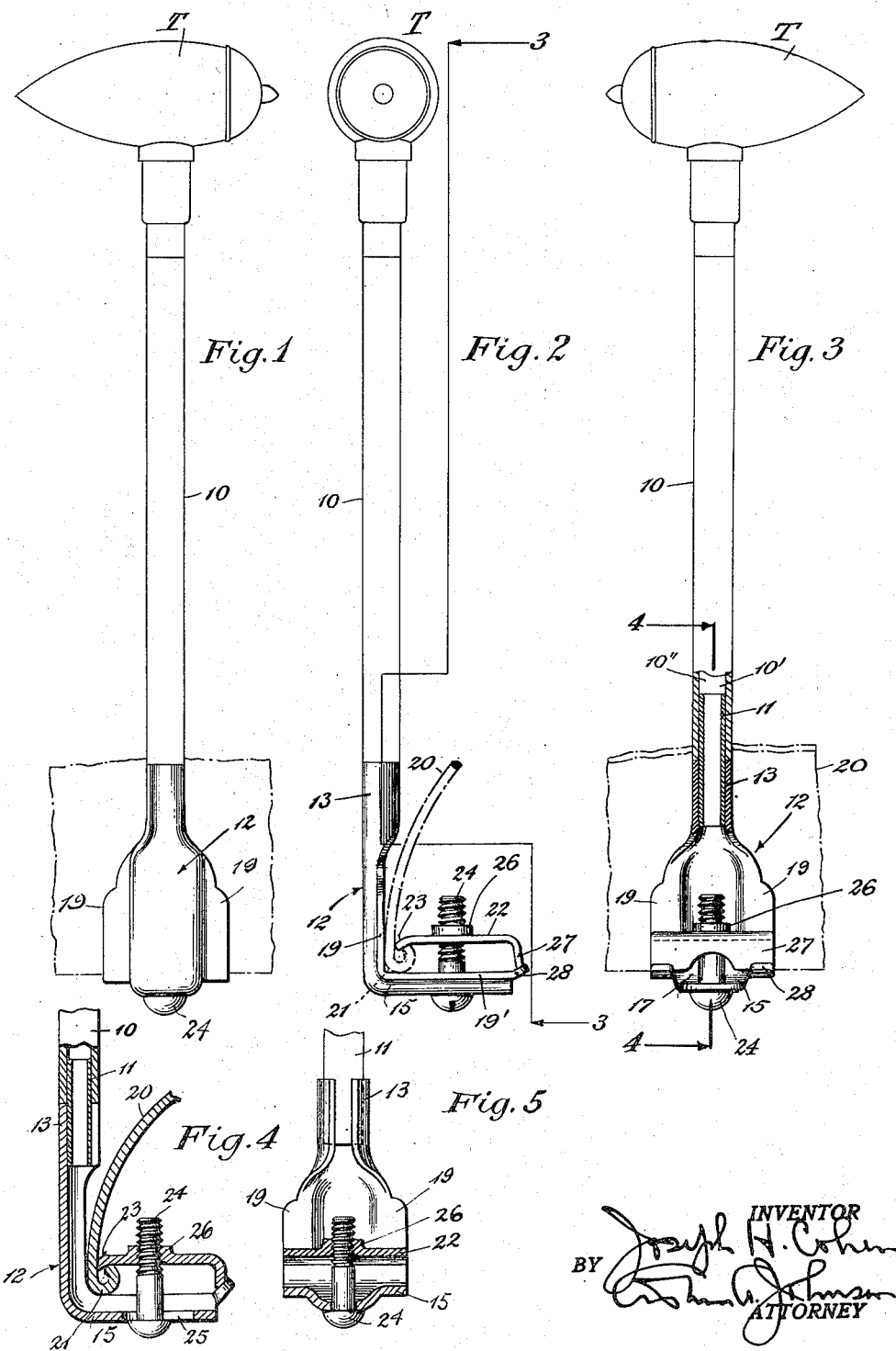
INVENTOR
Joseph H. Cohen
BY
ATTORNEY Patented July 13, 1937

2,087,217

UNITED STATES PATENT OFFICE 2,087,217

FENDER GUIDE

Joseph H. Cohen, Bridgeport, Conn., assignor to Casco Products Corporation, Bridgeport, Conn., a corporation of Connecticut Original application October 31, 1932, Serial No. 640,363. Patent No. 2,050,981, August 11, 1936. Divided and this application August 8, 1936, Serial No. 94,911

10 Claims. (Cl. 248—226)

This invention relates to mounting brackets, and, more particularly, has for a principal object thereof to provide an improved mounting bracket particularly valuable in connection with the mounting of a fender guide on the fender of an automobile and in this last connection to provide improved means for attaching such a fender guide at a lower portion thereof flatwise against the end of the fender.

According to the present invention, the fender guide is attached to the fender by a clamping member which engages the bead of the fender and which is of such construction that even though a single screw be provided, it firmly grips the bead of the fender and accommodates itself to fenders having beads of different sizes and shapes.

Other features and advantages will hereinafter appear.

The invention will be more clearly understood and the foregoing objects and advantages appreciated, from the following description, when taken in connection with the accompanying drawing, illustrating a now preferred embodiment of the new bracket of the present invention; in which drawing—

Figure 1 is a view showing said embodiment in side elevation, applied to a fender partially shown in dot-and-dash lines and thereto secured properly to position a fender guide the identifying elements of which are drawn in by lines which are comparatively light compared to those delineative of the bracket.

Fig. 2 is an end elevational view of the bracket, showing the same as viewed from the front end of the sight or target.

Fig. 3 shows the bracket in side elevation, but looking at the opposite side thereof from that seen in Fig. 1; this view, being taken on the line 3—3 of Fig. 2, also showing the bracket partially in vertical section.

Fig. 4 is a central vertical sectional view, taken on the line 4—4 of Fig. 3.

Fig. 5 is a fragmentary view showing a portion of the bracket as viewed when looking toward the left in Fig. 2.

In illustration of the present invention, the bracket provided thereby is shown as employed in connection with a fender guide for an automobile; such fender guide being described in detail, and claimed, in my copending application Serial No. 640,363, now United States Patent No. 2,050,981, granted August 11, 1936.

The present application is a division of said application, Serial No. 640,363, filed October 31, 1932.

While the bracket of the present invention may have other utilities, it is now deemed to be particularly valuable in mounting a fender guide on an automobile fender, and therefore such fender guide is illustrated in the accompanying drawing. Said guide includes a rod, staff or stem 10, of tubular form as indicated at 10', so as to have a central bore 10''; there being sweated into the lower end of said bore a tube or sleeve 11. At its upper end the stem 10 carries an enlarged mass, or sight or target, herein marked T, so that the driver of the vehicle may perceive the fender guide out of the corner of his eye without directly gazing at the stem.

In the present case, the lower end of said fender guide is shown as being secured rigidly to the bracket illustrated, and constituting a now preferred exemplification of the present invention; such bracket being marked 12. This securement is conveniently attained by extending the sleeve 11 down below the lower end of the stem 10, and sweating such downwardly protruded portion of the sleeve within a receptor provided therefor by shaping the upper portion of the bracket. This receptor is here in the form of a split-tube or collar 13 integral with the bracket.

The bracket 12 extends downwardly from its split-tube 13 constituting its point of attachment to the stem 10, and at its lower end the bracket is provided with a right angle bend so as to have a horizontal portion 15. This portion 15 and the vertical portion 16 of the bracket are preferably ribbed to strengthen the same and also to provide a clearance passage 17 for a lead wire for an electric light bulb (not shown) to be housed in target T when made of translucent material. The raised portions 19 of the bracket engage the surface of the fender 20; the raised portion 19' on the horizontal arm 15 engaging the bead 21 on the end of the fender.

In order to hold the fender guide to fenders having beads of various diameters and shapes, the bracket 12 is provided with a clamping plate 22, the construction of which causes it in its cooperation with the horizontal portion 15 of the bracket to accommodate itself to the particular kind of bead which is contained on the fender upon which the guide is to be mounted.

This plate 22 has at its forward end a downwardly projecting portion or hook 23 adapted, as shown in Figs. 2 and 4, to contact with the material of the fender and engage the bead at approximately the point where the end of the bead portion reengages the fender proper. The plate 22 is drawn toward the arm 15 of the bracket according to the present invention by a single screw 24 which passes through a slotted opening 25 in the lower arm 15 of the bracket and is threaded in a nipple 26 on the plate 22. The rear end of the plate 22 has a bent portion or ledge 27 extending vertically toward the arm 15 but does not engage the latter directly. Instead, it engages upwardly and outwardly extending arms 28 formed preferably but not essentially integral with the horizontal portion 15 of the bracket.

With the parts placed in the position shown in Fig. 4, when the screw 24 is tightened, it draws the plate 22 downwardly so that the hook portion or nose 23 firmly engages the bead 21. At the same time, the ledge 27 at the rear of the plate 22 tends to be forced down and in doing so it tends to move forwardly, that is, toward the fender because of the ledge 27 riding down the inclined surfaces 28. Accordingly, the plate 22, by the simple act of tightening the screw 24, is caused to press against the fender, thereby drawing the parts 19 of the vertical arm 16 against the outside edge of the fender and, at the same time, to move downwardly and firmly grip the bead 21 between the hooked portion 23 on the plate 22 and the portions 19 on the horizontal arm 15 of the bracket. If the bead on the fender is larger than that shown, the forward end of the plate 22 would be cocked upwardly, but even so in tightening the screw the plate 22 would be pushed forwardly against the material of the fender. This movement of the plate will continue until the material of the fender is firmly clamped between the vertical portion of the bracket and the nose 23 of the plate, whether the material of the fender is of light or heavy gage.

The inclined surfaces of the parts 27 and 28 respectively, may extend clear across the plate 22. It is, however, preferable to have the parts 28 at opposite sides only of the horizontal arm 15 so that the plate 22 may cant in accommodating itself to the portion of the fender with which it may happen to engage.

By having the screw 24 extend upwardly, the device may be very conveniently clamped to a fender, for there is always sufficient room below the edge of the fender for the manipulation of an upwardly directed screw driver.

Variations and modifications may be made within the scope of this invention and portions of the improvements may be used without others.

I claim:

1. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; and means including a screw for connecting the plate to the horizontal portion of the bracket and for drawing the same together while urging the nose horizontally toward the fender to clamp the bracket to the edge and bead of the fender.

2. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating guide and slide surfaces for effecting adjustment of the plate relative to the bracket, one carried by the plate and the other by the bracket; and means for connecting the plate to the horizontal portion of the bracket and for pulling down on said plate and urging said surfaces toward relative movement to move the nose horizontally toward the fender to clamp the bracket to the edge and bead of the fender.

3. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating inclined surfaces at the inner ends of the plate and horizontal portion of the bracket respectively; and means for connecting the horizontal portion of the bracket and plate together and for drawing the plate toward the horizontal portion of the bracket, said cooperating inclined surfaces being shaped to cause the plate to be urged outwardly into firm engagement with the material of the inner surface of the fender as it is being drawn toward said horizontal portion of the bracket.

4. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating inclined surfaces at the inner ends of the plate and horizontal portion of the bracket respectively; and means for connecting the horizontal portion of the bracket and plate together and for drawing the plate toward the horizontal portion of the bracket, said cooperating inclined surfaces being shaped to cause the plate to be urged outwardly into firm engagement with the material of the inner surface of the fender as it is being drawn toward said horizontal portion of the bracket, said connecting and draft means being constituted by a single screw engaging threads in said plate and passing upwardly thereto through an aperture in said horizontal portion of the bracket.

5. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating inclined surfaces at the inner ends of the plate and horizontal portion of the bracket respectively; and means for connecting the horizontal portion of the bracket and plate together and for drawing the plate toward the horizontal portion of the bracket, said cooperating inclined surfaces being shaped to cause the plate to be urged outwardly into firm engagement with the material of the inner surface of the fender as it is being drawn toward said horizontal portion of the bracket, said connecting and draft means being constituted by a single screw engaging threads in said plate and passing upwardly thereto through an aperture in said horizontal portion of the bracket, said screw being located between the nose on the plate and the inclined surfaces of the plate.

6. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating inclined surfaces at the inner ends of the plate and horizontal portion of the bracket respectively; and means for connecting the horizontal portion of the bracket and plate together and for drawing the plate toward the horizontal portion of the bracket, said cooperating inclined surfaces being shaped to cause the plate to be urged outwardly into firm engagement with the material of the inner surface of the fender as it is being drawn toward said horizontal portion of the bracket, said connecting and draft means being constituted by a single screw engaging threads in said plate and passing upwardly thereto through an aperture in said horizontal portion of the bracket, said screw being located between the nose on the plate and the inclined surfaces of the plate, and the inclined surfaces on the horizontal portion of the bracket being at the front and back edges thereof so as to allow the plate to cant into position conforming with the portion of the fender bead engaged by the nose of the plate.

7. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating surfaces one of which is inclined, said surfaces being at the inner ends of the plate and horizontal portion of the bracket respectively; and means for connecting the horizontal portion of the bracket and plate together and for drawing the plate toward the horizontal portion of the bracket, said cooperating surfaces being shaped to cause the plate to be urged outwardly into firm engagement with the material of the inner surface of the fender as it is being drawn toward said horizontal portion of the bracket.

8. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; cooperating surfaces on the plate and horizontal portion of the bracket respectively; and means for connecting the horizontal portion of the bracket and plate together and for drawing the plate toward the horizontal portion of the bracket and in cooperation with said surfaces for causing the plate to be urged outwardly into firm engagement with the material of the inner surface of the fender as it is being drawn toward said horizontal portion of the bracket, said connecting and draft means being operable to pull downwardly on the plate in securing the bracket to the fender.

9. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; means for connecting the horizontal portion of the bracket and plate together and for drawing the plate toward the horizontal portion of the bracket; and means operated by the means last mentioned for simultaneously shifting the plate longitudinally along the length of the horizontal portion of the bracket to force said nose into firm engagement with the bead and the material of the inner surface of the fender, said connecting and draft means including a threaded element operable to pull downwardly on said plate in securing the bracket to the fender.

10. A mounting bracket for a fender guide or the like for securing a portion of the latter flatwise to the edge of a fender, said bracket having vertical and horizontal portions for engaging the outside and bottom respectively of a bead at the lower edge of the fender; a plate lying substantially parallel to the horizontal portion of the bracket; a nose at the forward end of the plate adapted to engage the upper edge of the fender bead and the adjacent material of the inner surface of the fender; and means, including a means connecting the plate and the bracket and passing through the horizontal portion of the bracket and operable from below the bracket, for pulling down on the plate to move the same flatwisely downward and for simultaneously endwisely shifting the plate to force the nose into firm engagement with the bead and the material of the inner surface of the fender.

JOSEPH H. COHEN.